US009157462B2

(12) United States Patent
Nonaka et al.

(10) Patent No.: US 9,157,462 B2
(45) Date of Patent: Oct. 13, 2015

(54) BOLTED JOINT STRUCTURE

(75) Inventors: Yoshinori Nonaka, Tokyo (JP);
Masahiro Kashiwagi, Tokyo (JP);
Toshio Abe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/879,886

(22) PCT Filed: Oct. 12, 2011

(86) PCT No.: PCT/JP2011/073411
§ 371 (c)(1),
(2), (4) Date: Apr. 17, 2013

(87) PCT Pub. No.: WO2012/081298
PCT Pub. Date: Jun. 21, 2012

(65) Prior Publication Data
US 2013/0287490 A1 Oct. 31, 2013

(30) Foreign Application Priority Data
Dec. 14, 2010 (JP) ................................. 2010-277755

(51) Int. Cl.
*F16B 5/02* (2006.01)
*F16B 31/06* (2006.01)
*B64C 1/06* (2006.01)

(52) U.S. Cl.
CPC . *F16B 5/02* (2013.01); *F16B 31/06* (2013.01); *B64C 1/06* (2013.01); *Y10T 403/74* (2015.01)

(58) Field of Classification Search
CPC ........ F16B 5/0088; F16B 5/02; F16B 5/0208; F16B 5/0241; F16B 5/04
USPC ............. 403/312, 404, 408.1; 244/131, 123.1
See application file for complete search history.

(56) References Cited

U.S. PATENT DOCUMENTS 3,270,410 A * 9/1966 Salter et al. ...................... 29/446
4,226,916 A * 10/1980 Schulz et al. ............... 428/542.2
4,579,475 A * 4/1986 Hart-Smith et al. .......... 403/312
(Continued)

FOREIGN PATENT DOCUMENTS

| CN | 101146711 | 3/2008 |
| CN | 101674929 | 3/2010 |

(Continued)

OTHER PUBLICATIONS

International Preliminary Report on Patentability and Written Opinion of the International Searching Authority issued Jun. 18, 2013 in corresponding International Application No. PCT/JP2011/073411 (with English translation).

(Continued)

*Primary Examiner* — Daniel Wiley
(74) *Attorney, Agent, or Firm* — Wenderoth, Lind & Ponack, L.L.P.

(57) ABSTRACT

Joint parts of joinable plates to be joined to each other are joined by a plurality of joining bolts. The joining bolts are arranged in a direction of a tensile load F. The joint parts of the plate members have four sections $T_1$ to $T_4$ that vary in elastic modulus. The elastic modulus ($E_1$ to $E_4$) of these sections $T_1$ to $T_4$ have a relationship of $E_1(T_1) > E_2(T_2) > E_3(T_3) > E_4(T_4)$.

7 Claims, 3 Drawing Sheets

(56) References Cited

U.S. PATENT DOCUMENTS

| | | | |
|---|---|---|---|
| 5,720,134 A * | 2/1998 | Kurtz | 52/170 |
| 2009/0084899 A1 * | 4/2009 | Kismarton et al. | 244/123.1 |
| 2009/0232591 A1 | 9/2009 | Hethcock et al. | |

FOREIGN PATENT DOCUMENTS

| | | | |
|---|---|---|---|
| DE | 19925953 C1 * | 9/2000 | F16B 5/00 |
| JP | 7-156888 | 6/1995 | |
| JP | 2000-141064 | 5/2000 | |
| JP | 2004-196157 | 7/2004 | |
| JP | 2009-144914 | 7/2009 | |
| JP | 2009-539702 | 11/2009 | |
| SU | 1224476 | 4/1986 | |

OTHER PUBLICATIONS

International Search Report issued Jan. 17, 2012 in corresponding International Application No. PCT/JP2011/073411.
Examiner's Report issued Sep. 10, 2014 in corresponding Canadian Application No. 2,813,166.
Chinese Office Action issued Jun. 3, 2014 in corresponding Chinese Application No. 201180049336.1 (with English translation).
Decision to Grant a Patent issued Dec. 19, 2014 in corresponding Japanese Patent Application No. JP2010-277755, together with English translation thereof.

* cited by examiner

BOLTED JOINT STRUCTURE

TECHNICAL FIELD

The present invention relates to a bolted joint structure suitable for use in a joint part which is strictly required to be lightweight and to have high joint strength, such as a joint part of a wing panel coupled to a body part of an airplane.

BACKGROUND ART

In the case where the joint strength of the joint part of a joinable member is strictly required to have joint strength, a bolted joint having a plurality of bolts arranged in a load direction is used as a coupling means. As a result, the load applied to the joint part is shared by the bolted joint.

In Patent literature 1, it is disclosed to use these bolted joints for joining blade panels or the like of an aircraft.

A conventional bolted joint structure using a plurality of bolts is illustrated in FIG. 7. The bolt join structure 100 is configured such that a plurality of joint bolts 104a-104d (four bolts in FIG. 7) for two plates 102a, 102 to be joined are arranged along a direction of tensile load F.

In the bolted joint structure 100, generally bolts 104b, 104c disposed on a center side have less shared load than bolts 104a, 104d disposed on an outer end side due to small deflection difference of the plates which each transmit the load on the joint parts to the bolts. This state is indicated by line A in FIG. 3.

In the case where the joint parts of the joinable member is made of a composite material, the shared load between the bolts on the outer end side tend to be larger as the composite material has lower ductility than metal. Therefore, it is difficult to increase the load on the joint parts even by using more bolts to join the joint parts.

CITATION LIST

Patent Literature

[PTL 1]
JP 2009-539702 T

TECHNICAL PROBLEM

The inventors have studied a variety of bolted joint structure for balancing the shared load on the bolts. The bolted joint structure invented by the inventors is illustrated in FIG. 8. In FIG. 8, the bolted joint structure 110 is configured so that the joinable plates 102a, 102b at the joint part each decrease in thickness toward its end. As a result, an elastic modulus of each plate 102a, 102b around each joining bolt decreases toward its end. With reduced elastic modulus, stiffness of the plate can be reduced and thus the shared load is applied more evenly to the bolts than before.

However, the bolted joint structure 110 has issues that, by reducing the thickness of the plates 102a, 102b at an outer part, the bolted joint structure 110 may not satisfy other design standards such as strength of the plate and also the shape of the joint part becomes more complicated, which results in more hours for machining the joint part. Particularly, in the case where the joinable plate is made of a composite material which is formed by stacking a plurality of thin film sheets, the number of stacked thin layer sheets must be reduced to change the thickness of the composite material. This may require more work and also strength symmetry or the like may be compromised by changing the thickness of the joint part.

As alternative to this, the inventors thought to reduce the width of the joinable plate 102a, 102b toward the end. As a result, the elastic modulus of the plate decreases toward the end and similarly the shared load among the bolts is balanced. However, this bolt joint structure may have an issue as far as satisfying the design standard such as the required strength or the like.

In view of the above issues, it is an object of the present invention to provide a bolted joint structure by which load is applied evenly to joining bolts, which satisfies design standards of a joint part and which is easily machinable.

SUMMARY OF THE INVENTION

To achieve the above object, a bolted joint structure according to the present invention comprises:
joinable members to be joined; and
a plurality of joining bolts aligned along a load direction, the plurality of joining bolts joining the joinable members at joint parts,
wherein the joint parts or a load transfer member for transferring the load applied to the joint parts to the joining bolts is made of a material having an elastic modulus lower at the joint part disposed on an outer end side of the joinable members so that shared load is applied evenly to each of the joining bolts.

In the present invention, elastic modulus of the joint parts or the load transfer member for transferring the load applied to the joint parts to the joining bolts is changed for each of the joining bolts. More specifically, a peripheral region of the joining bolt disposed on the outer end side is made of a material having a low elastic modulus to lower stiffness of the peripheral region. As a result, the shared load on the bolt on the outer end side is reduced. In this manner, the shared load is equalized among the joining bolts and thus the transferable load of the joint part increases in proportion to the number of the joining bolts. Further, the shared load of the joining bolts can be equalized regardless of configurations of the joint parts and thus, no extra work is needed to manufacture the joining parts.

According to the present invention, in the case where at least one of the joinable members is made of a composite material, type and content of reinforcement fiber may vary in a base material of the joint part along the load direction so as to change the elastic modulus of the joint parts along the load direction. As a result, during manufacture of the composite material, such a property that the elastic modulus varies in a continuous manner along the load direction can be easily applied. This facilitates forming of the joint part applicable to the bolted joint structure of the present invention.

According to the present invention, the load transfer member may be a reinforcing plate provided between the joint part of the joinable members and the joining bolts. By using the reinforcing plate whose elastic modulus varies along the load direction, no special process is needed for the joinable plate and joinable plate can be used regardless of its elastic modulus. Thus, the bolted joint structure can be made in a simple manner and at low cost.

According to the present invention, the load transfer member may be a sleeve, and the sleeve may be provided between the joint part of the joinable members and the joining bolts disposed on the outer end side of the joinable members and may have an elastic modulus lower than the joinable member. By providing the sleeve of low elastic modulus only on the bolts disposed on the outer end side, it is possible to reduce the shared load on the bolts on the outer end side. Therefore, the joinable member may be used regardless of its elastic modulus and also the reinforcing plate is not needed. As a result, the bolted joint structure can be made in a simple manner and at low cost.

Further, the load transfer member may be a sleeve provided between the joint part of the joinable members and the joining bolts and the sleeve may have a lower elastic modulus on the outer end side of the joinable members. As a result, the shared load of a plurality of the joining bolts can be equalized with precision.

Advantageous Effects

According to the present invention, the bolted joint structure is configured with joinable members to be joined; and a plurality of joining bolts aligned along a load direction, the plurality of joining bolts joining the joinable members at joint parts, and the joint parts or a load transfer member for transferring the load applied to the joint parts to the joining bolts is made of a material having an elastic modulus lower at the joint part disposed on an outer end side of the joinable members so that shared load is applied evenly to each of the joining bolts. Thus, the shared load of the joining bolts can be equalized regardless of configurations of the joint parts. Therefore, no extra work is needed for the joining parts and it is possible to attain the bolted joint structure that does not conflict with the design standards.

DETAILED DESCRIPTION

Embodiments of the present invention will now be described in detail with reference to the accompanying drawings. It is intended, however, that unless particularly specified in these embodiments, dimensions, materials, shape, its relative positions and the like shall be interpreted as illustrative only and not limitative of the scope of the present invention.

First Embodiment

Figure 1:
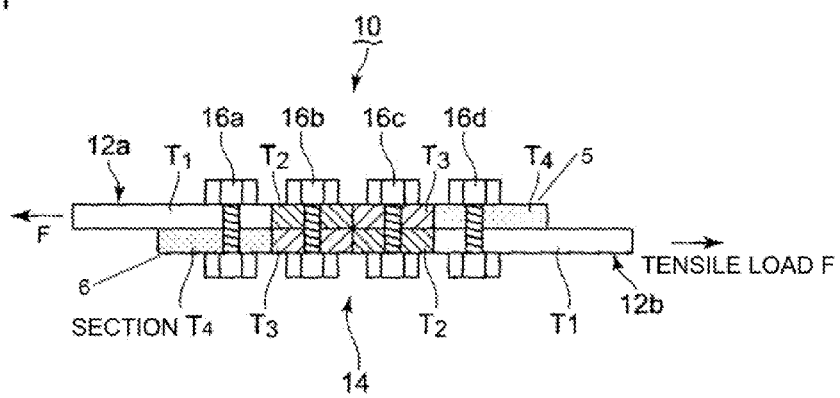
FIG. 1 is a schematic illustration of a bolted joint structure according to a first embodiment of the present invention.
Figure 2:
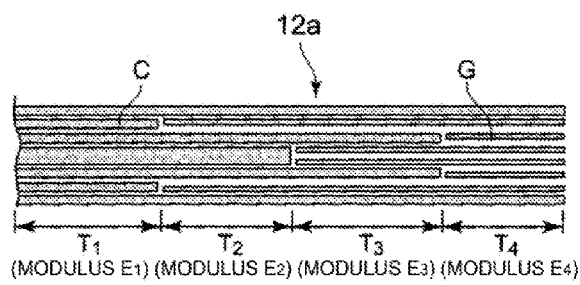
FIG. 2 is an illustration of configurations of joint parts of the first embodiment.
Figure 3:
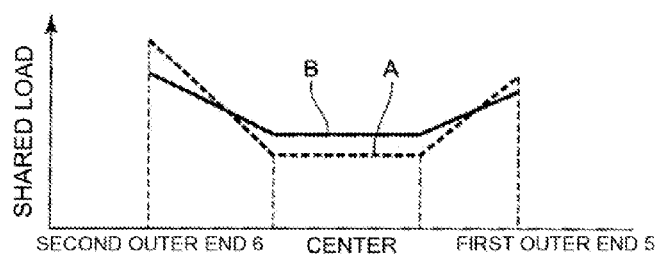
FIG. 3 is a graph indicating balancing of load on bolts using the bolted joint structure.

A first embodiment of the present invention is described in reference to FIG. 1 to FIG. 3. FIG. 1 is a schematic illustration of a bolted joint structure 10 according to this embodiment. In the bolted joint structure 10 of FIG. 1, plate members 12a, 12b to be joined to each other are made of a composite material. A joint part 14 formed of the plate members 12a, 12b each have four sections $T_1$ to $T_4$ that vary in elastic modulus from an inner side toward an outer end side of each joinable plate member. The elastic modulus ($E_1$ to $E_4$) of these sections have the following relationship.

$$E_1(T_1) > E_2(T_2) > E_3(T_3) > E_4(T_4)$$

Referring to FIG. 2, configurations of the joint parts 14 of the joinable plate members 12a, 12b are described below using the plate member 12a as an example. In FIG. 2, two types of fiber C and G are reinforcing agents of the composite material making the plate member 12a. Thick lines are the fiber C whereas thin lines are the fiber G. The fiber C and the fiber G have a relationship of elastic modulus, Fiber C>Fiber G. For instance, the fiber C is carbon fiber and the fiber G is glass fiber.

Distribution of the fiber C and the fiber G is changed along the load direction so as to form the sections $T_1$ to $T_4$ having different elastic moduli. The fibers C and D are impregnated with resin or metal which becomes a matrix. The joinable plate member 12b is produced in the same manner as the joinable plate member 12a.

The joinable plate member 12a, 12b may be produced by separately forming a plurality of thin-film sheets formed of fibers and matrix and then stacking the thin-film sheets together. Alternatively, the joinable plate member 12a, 12b may be produced as a plate member having a thickness of the joinable plate member without the stacking step.

The joint part 14 formed of the joinable plate members 12a, 12b produced in this manner are joined together by arranging joining bolts 16a to 16d in the sections $T_1$ to $T_4$ respectively. The joint parts 14 are subjected to the tensile load F. In the bolted joint structure 10 having the above structure, the joinable plate members 12a, 12b decrease in elastic modulus toward the first outer end 5 and the second outer end 6 of the joint part 14, and thus the joinable plate members 12a, 12b decrease in stiffness toward the outer ends 5, 6. Therefore, it is possible to reduce the shared load on the joining bolt disposed on each end side. More specifically, the load on each bolt changes as indicated by line B of FIG. 3.

The shared load is evenly applied on each of the joining bolts and thus transferable load increases in proportion to the number of the joining bolts. Thus, this bolted joint structure is applicable to joint parts where strict joint strength is required such as joint parts of a blade or a fuselage of an aircraft. In the case of forming the composite material by stacking and bonding a plurality of thin-layer sheets made of reinforcing agents and matrix, it is difficult to change the thickness of the composite material, and if the thickness is changed, it is difficult to maintain strength symmetry.

In this embodiment, the thickness of the joinable plate members 12a, 12b is not changed and thus, the use of the composite material does not require additional processing. In the case where the joinable plate members 12a, 12b are made of a composite material, types and percentages of the fibers in the form of reinforcing agents may be changed. This makes it easier to change the elastic moduli of the sections along the load direction.

Second Embodiment

Figure 4:
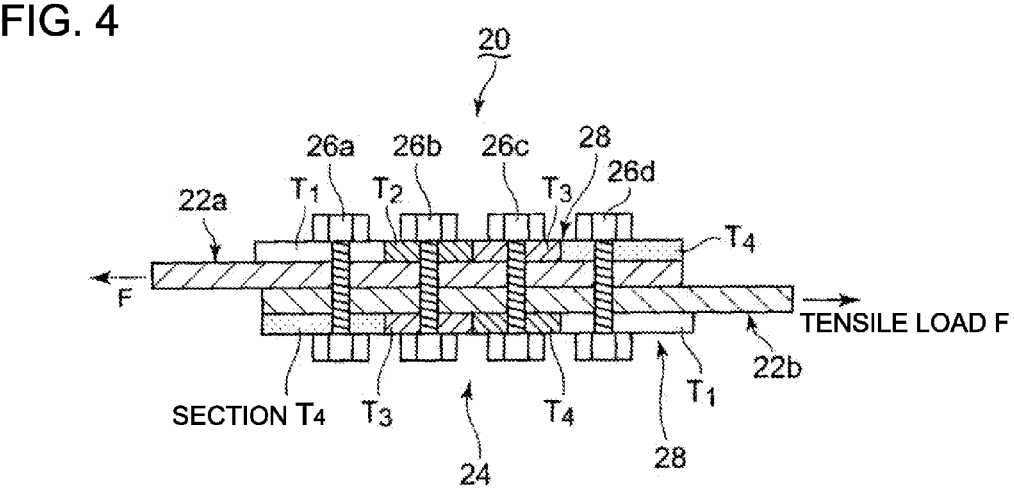
FIG. 4 is a schematic illustration of a bolted joint structure according to a second embodiment of the present invention.
Figure 5:
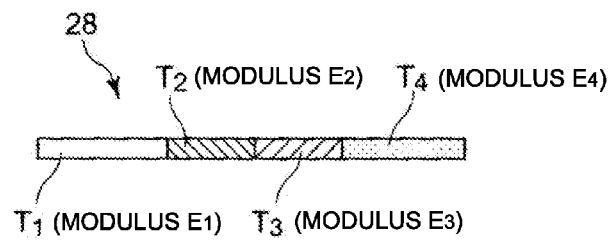
FIG. 5 is an illustration of configurations of reinforcing plates of the second embodiment.

A second embodiment of the present invention is described in reference to FIG. 4 and FIG. 5. A bolted joint structure of this embodiment includes a reinforcing plate 28 at the joint parts 24. The joinable plate members 22a, 22b are made of a composite material. However, this composite material is not formed in such a manner that the elastic modulus varies in the load direction as in the case of the first embodiment. A pair of the reinforcing plates 28 is provided between the joinable plate member 22a and the joining bolts 26a to 26d, and between the joinable plate member 22a, 22b and each bolt.

The configuration of the reinforcing plate 28a is described in reference to FIG. 5. In FIG. 5, the reinforcing member is made of a composite material which is produced in the same manner as the joinable plates 12a, 12b of the first embodiment shown in FIG. 2. More specifically, the reinforcing plate 28 has four sections $T_1$ to $T_4$ that vary in elastic modulus formed by changing types and percentages of the fibers in the form of reinforcing agents in the direction the tensile load F is applied. The elastic modulus ($E_1$ to $E_4$) of these sections have the following relationship.

$$E_1(T_1) > E_2(T_2) > E_3(T_3) > E_4(T_4)$$

This pair of reinforcing plates 28 having the above configuration is arranged so that the section $T_4$ having low elastic modulus is positioned on the outer end side of the joint parts of the joinable plates 22a, 22b and the section $T_1$ having high elastic modulus is positioned on the center side. To each of the joining bolts 26a to 26d, the tensile load F is transmitted from the joinable plates 22a, 22b via the reinforcing plates 28. However, to the joining bolt disposed on the outer end side and being subjected to large shared load, the load is transmitted from the reinforcing plate 28 of low elastic modulus and low stiffness, thereby reducing the shared load. More specifically, the load applied on each of the joining bolts 26a-26d of this embodiment is indicated by line B in FIG. 3.

According to the bolted joint structure 20 of this embodiment, in addition to the operational effects obtained in the first embodiment, it is not necessary to process the composite material itself which forms the joinable plates 22a, 22b and this makes it easier to manufacture the joinable plates 22a, 22b.

Third Embodiment

Figure 6:
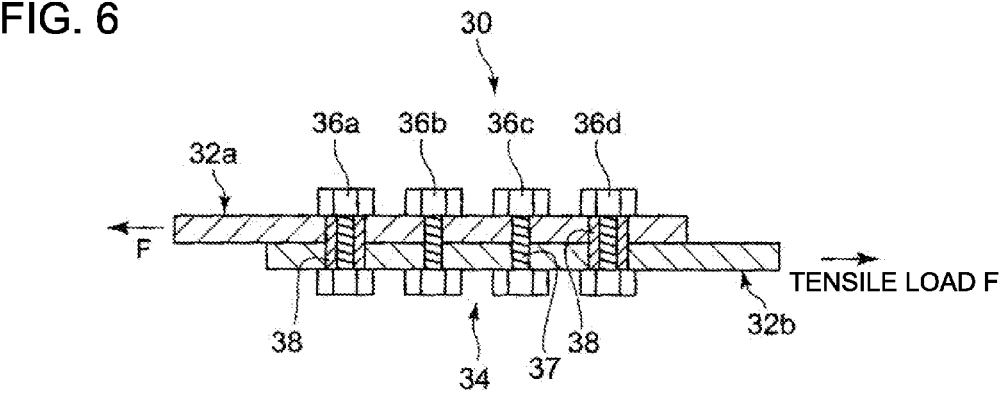
FIG. 6 is a schematic illustration of a bolted joint structure according to a third embodiment of the present invention.
Figure 7:
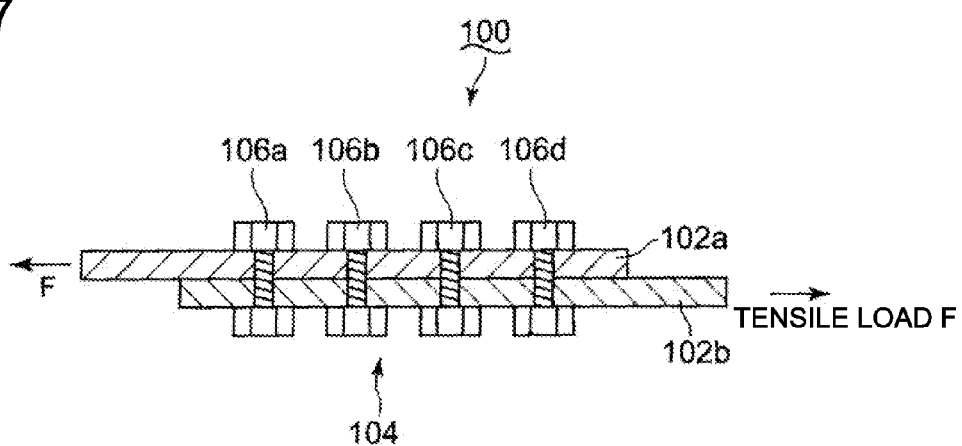
FIG. 7 is an illustration of a bolted joint structure of related art.
Figure 8:
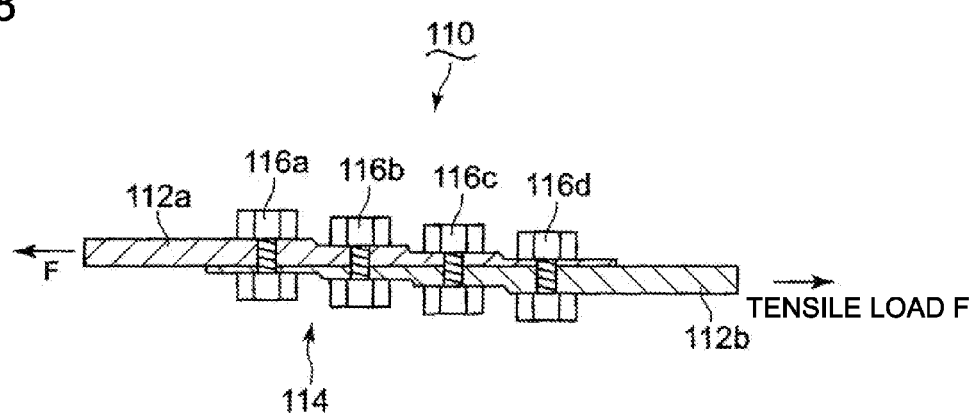
FIG. 8 is an illustration of a bolted joint structure as intermediary technology invented by the inventors.

A third embodiment of the present invention is described in reference to FIG. 6. A bolted joint structure 30 of this embodiment is configured such that four joining bolts 36a-36d are provided at a joint part 34b and a sleeve 38 is provided between a screw part 37 of each of the joining bolts 36a, 36d disposed on the outer end side and each of the joinable plates 32a, 32b. The joinable plates 32a, 32b of this embodiment uses a composite material whose elastic modulus is not varied, in the same manner as the second embodiment.

The sleeve 38 is made of a material having lower elastic modulus than the joinable plates 32a, 32b. To the bolts 36a, 36d on the outer end side, the tensile load F is transmitted via the sleeves 38. Thus, the shared load on the bolts 36a, 36d on the outer end side decreases as indicated by line B in FIG. 3, thereby applying the shared load evenly on each of the joining bolts 36a-36d.

According to the bolted joint structure 30 of this embodiment, it is not necessary to vary the elastic modulus of the joinable plates 32a, 32b and thus the joinable plates 32a, 32b may be made of a regular composite material. Further, it is not necessary to use the reinforcing plate 28 whose elastic modulus varies as in the case of the second embodiment. By simply providing at the bolts 36a, 36d the sleeves 38 having lower modulus than the joinable plates 32a, 32b, it is easy to process compared to the first and second embodiments.

In the third embodiment, the sleeves 38 are provided at the bolts 36a, 36d disposed on the outer end side. However, this is not limitative and the sleeves may be provided at the bolts 36b, 36c disposed on the center side in addition to the bolts 36a, 36d and the sleeves at the bolts 36b, 36c on the center side may have higher elastic modulus than the sleeves 38 at the bolts 36a, 36d on the outer end side. The shared load can be applied to each of the joining bolts evenly in this manner as well.

INDUSTRIAL APPLICABILITY

According to the present invention, in the bolted joint structure having a plurality of joining bolts arranged in the load direction, the shared load is equalized among the joining bolts in a simple manner and at low cost and joint strength can be increased in proportion to the number of the joining bolts and the bolted joint structure is suitable for use in a joint part which requires lightweight and high joint strength, such as a joint part of a wing panel coupled to a body part of an airplane.

The invention claimed is:

1. A bolt fastening structure comprising:
a plurality of members including a first joinable member and a second joinable member overlapping said first joinable member to form a joint part, said first joinable member having a first end forming a first outer end of said joint part, said second joinable member having a second end spaced apart from said first end of said first joinable member along a load direction so as to form a second outer end of said joint part; and
a plurality of joining bolts aligned along the load direction between said first outer end of said joint part and said second outer end of said joint part, said joining bolts joining said first joinable member and said second joinable member, said plurality of joining bolts including:
a first bolt at said first outer end of said joint part;
a second bolt at said second outer end of said joint part; and
a third bolt between said first bolt and said second bolt;
wherein said joint part formed of said overlapped plurality of members has a first portion around said first bolt and a second portion around said second bolt, each of said first portion and said second portion comprising a material having an elastic modulus lower than an elastic modulus of a material of a third portion of said joint part around said third bolt.

2. The bolt fastening structure according to claim 1, wherein said first joinable member is configured to have a decreasing elastic modulus in a direction approaching said first end of said first joinable member so that said material of said first portion of said joint part around said first bolt has an elastic modulus lower than said material of said third portion of said joint part around said third bolt, and
wherein said second joinable member is configured to have a decreasing elastic modulus in a direction approaching said second end of said second joinable member so that said material of said second portion of said joint part around said second bolt has an elastic modulus lower than said material of said third portion of said joint part around said third bolt.

3. The bolt fastening structure according to claim 2, wherein each of said first joinable member and said second joinable member is formed of a composite material including reinforcement fiber, said first joinable member having a distribution of variation of said reinforcement fiber so that said composite material forming said first joinable member has a decreasing elastic modulus in a direction approaching said first end of said first joinable member, and said second joinable member having a distribution of variation of said reinforcement fiber so that said composite material forming said second joinable member has a decreasing elastic modulus in a direction approaching said second end of said first joinable member.

4. The bolt fastening structure according to claim 1, wherein said plurality of members further includes a first reinforcing member overlapped with said first joinable member between said first outer end and said second outer end of said joint part, and a second reinforcing member overlapped with said second joinable member between said first outer end and said second outer end of said joint part,
   wherein a material forming said first reinforcing member has a decreasing elastic modulus in a direction approaching said first outer end of said joint part so that said material of said first portion of said joint part around said first bolt has an elastic modulus lower than said material of said third portion around said third bolt; and
   wherein a material forming said second reinforcing member has a decreasing elastic modulus in a direction approaching said second outer end of said joint part so that said material of said second portion of said joint part around said second bolt has an elastic modulus lower than said material of said third portion around said third bolt.

5. The bolt fastening structure according to claim 4, wherein each of said first reinforcing member and said second reinforcing member is formed of a composite material including reinforcement fiber, said first reinforcing member having a distribution of variation of said reinforcement fiber such that said first reinforcing member has a reduced elastic modulus in a direction approaching said first outer end of said joint part, and said second reinforcing member having a distribution of variation of said reinforcement fiber such that said second reinforcing member has reduced elastic modulus in a direction approaching said second outer end of said joint part.

6. The bolt fastening structure according to claim 1, further comprising a first sleeve attached to said first bolt and a second sleeve attached to said second bolt, each of said first sleeve and said second sleeve having an elastic modulus lower than an elastic modulus of each of said first joinable member and said second joinable member so that said first sleeve and said second sleeve form said first portion and said second portion, respectively.

7. The bolt fastening structure according to claim 1, further comprising a first sleeve attached to said first bolt, a second sleeve attached to said second bolt, and a third sleeve attached to said third bolt, wherein each of said first sleeve and said second sleeve has an elastic modulus lower than an elastic modulus of said third sleeve so that said first sleeve forms said first portion, said second sleeve forms said second portion, and said third sleeve forms said third portion.

* * * * *